(12) United States Patent
Doyle

(10) Patent No.: US 8,398,334 B1
(45) Date of Patent: Mar. 19, 2013

(54) SELF-POSITIONING SUBSEA OIL SPILL CONTAINMENT SYSTEM

(76) Inventor: Robert Doyle, Houston, TX (US)

(*) Notice: Subject to any disclaimer, the term of this patent is extended or adjusted under 35 U.S.C. 154(b) by 0 days.

(21) Appl. No.: 13/454,537

(22) Filed: Apr. 24, 2012

(51) Int. Cl.
*E02B 15/04* (2006.01)

(52) U.S. Cl. ........................................... 405/64

(58) Field of Classification Search ............... 405/63–68, 405/60; 114/240 A, 240 C, 240 D, 240 E, 114/240 R, 241; *E02B 15/04*
See application file for complete search history.

(56) References Cited

U.S. PATENT DOCUMENTS

| | | | |
|---|---|---|---|
| 3,321,923 A | 5/1967 | Smith et al. | |
| 3,608,316 A | 9/1971 | Manuel | |
| 3,839,870 A | 10/1974 | Ryan | |
| 4,089,178 A * | 5/1978 | Kinase et al. | 405/66 |
| 4,283,159 A | 8/1981 | Johnson et al. | |
| 4,373,834 A | 2/1983 | Grace | |
| 4,626,132 A | 12/1986 | Allen | |
| 4,627,766 A * | 12/1986 | Marquet | 405/195.1 |
| 5,066,164 A | 11/1991 | Tomosy | |
| 5,197,821 A | 3/1993 | Cain et al. | |
| 5,244,365 A | 9/1993 | Catcher | |
| 5,328,296 A | 7/1994 | Lahar et al. | |
| 5,372,455 A | 12/1994 | Tarca | |
| 5,407,575 A | 4/1995 | Vinsonhaler | |
| 5,470,467 A | 11/1995 | Soule | |
| 5,533,832 A | 7/1996 | Dugger | |
| 6,739,801 B2 * | 5/2004 | Dreyer | 405/70 |
| 6,854,927 B2 * | 2/2005 | Miyazaki | 405/70 |
| 7,326,354 B2 | 2/2008 | Ferreira | |

* cited by examiner

*Primary Examiner* — David J. Bagnell
*Assistant Examiner* — Kyle Armstrong
(74) *Attorney, Agent, or Firm* — W. Allen Marcontell

(57) ABSTRACT

A containment system for retaining spills in a body of water. The containment system remains in a submerged position for continuous monitoring and is deployed at the surface when activated for containment purposes. System aspects include a vertically retractable barrier configured to encircle at-risk infrastructure; a ballast system coupled to the barrier, the ballast system adapted to both submerge to a target depth upon receiving submerging signals and surface upon receiving surfacing signals; and a deployment control system in operative communication with the ballast system, the deployment control system configured to send submerging signals to employ the ballast system to submerge to a standby depth for extended periods of nominal operating conditions, and send surfacing signals to employ the ballast system to surface upon spill conditions; and may also include a self-propulsion system for containment system position management and an access gate for emergency vessel passage.

12 Claims, 11 Drawing Sheets

2B

2B

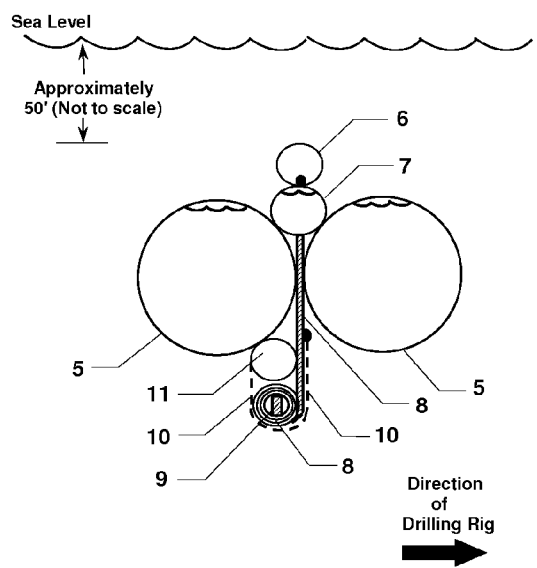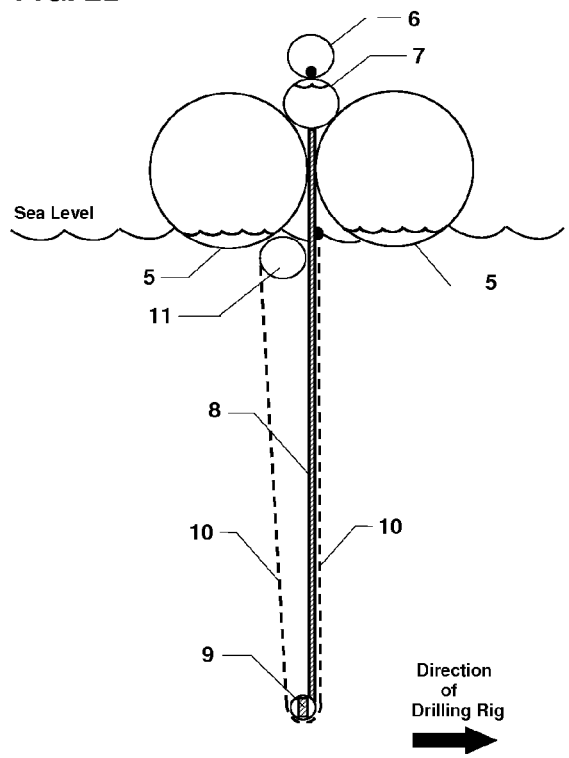

SELF-POSITIONING SUBSEA OIL SPILL CONTAINMENT SYSTEM

FIELD

The present disclosure relates to systems for the containment of floating material such as oil spills in a body of water. More particularly, the present disclosure relates to containment systems that form a barrier against the spread of the oil spill where the systems are self-propelled and submersible containing retractable barrier curtains and access gates.

BACKGROUND

Marine oil containment systems to date have been typically small scale measures initiated a period of time after a spill. Primarily, these systems use flexible, oil-resistant tubes attached to vertical curtains that must be towed to the spill site and then deployed in a circular fashion by small vessels in order to contain oil spills. This operation may require up to several days in order to complete the installation process. Once the oil is contained in small enclosures, it is usually recovered from the surface through a vacuum, absorption or adsorption process. Rigid boom systems have been used in a similar manner. These techniques have usually been applied following smaller spills and, unfortunately, are not effective in larger accidents, resulting in only a small amount of the spilled oil being captured. In major spills, these techniques are virtually useless. In fact, the offshore oil industry has noted in recent press announcements that it presently does not have the capability of containing very large oil spills, such as the disaster that occurred in the Gulf of Mexico during April of 2010.

Large oil spills are generally initiated by an explosion caused by natural gas escaping from the well and igniting at the surface during the drilling, completing or working over of an oil well. Explosions are not uncommon, since over the past few years there have been an average of about five serious explosions per year recorded in the Gulf of Mexico. Escaping gas may be the result of improper operating practices, equipment failure, inferior engineering design, and other similar incidents or combinations of these factors. In some cases, an explosion may damage the blowout preventer. The blowout preventer is intended as the device capable of stopping the resulting uncontrollable surge of gas-charged crude oil from the well. When the blowout preventer is damaged or otherwise fails, a major blowout generally follows. This can involve an out-of-control flow of oil and a fire accompanied by a large oil spill. Experience has shown that the fire is usually confined to a relatively small area around the well and does not spread very far because the extremely turbulent action of the escaping oil and gas combined with churning sea water. As such, complete burning of the oil or gas will not occur. Much of the gas then escapes into the atmosphere while the oil escapes the area of the well and becomes a large oil spill.

In the past, various patents have addressed the problems of oil spill containment. For example, U.S. Pat. No. 3,321,923, issued on May 30, 1967 to Smith et al., is an early patent dealing with a steerable self-powered floating structure. This self-powered, solid floating boom can be launched on the water surface and paid out from storage facilities and moved into position to perform rescue operations or to surround floating material. This floating structure has its own self-powered motive force supplied by separate onshore fluid pumping equipment. It can be steered through hydraulic forces from power nozzles by either remote radio control or by a manual control station directly connected to the movable boom. The boom is preferably formed entirely of a solid, lightweight plastic material with relatively stiff sections joined by relatively flexible sections in order to promote an accordion-folding of the boom. The system itself moves in a forward direction only since its power nozzles are fixed to the body of the device where steering is accomplished by varying the velocity of fluid passing through two power nozzles directed at an angle to each other.

U.S. Pat. No. 4,283,159, issued on Aug. 11, 1981 to Johnson et al., shows a protective shroud for offshore oil wells. A hollow shroud structure is of circular cross-section so as to surround an oil well. Servo-controlled valves, jets and pumps can locate the structure precisely in place. The shroud structure can be erected before or after drilling and can be moved and reused at different sites. The shroud structure can have a closed top or open top.

U.S. Pat. No. 4,373,834, issued on Feb. 15, 1983 to F. J. Grace, describes a portable offshore well installation apparatus. This apparatus has a pollution control curtain surrounding drilling equipment between the surface of the water and a well head. The curtain includes a submerged anchor ring with an axially extendable water-impermeable sleeve secured at its lower end to the top of the anchor ring. A float ring is secured to the upper end of the extendable sleeve. A plurality of longitudinally-spaced buoyant rings are attached at suitable intervals about the periphery of the sleeve to provide a uniform axial extension of the sleeve. A fillable retriever ring is secured to a lower portion of the anchor ring to facilitate installation and removal of the curtain from the well site when the retriever ring is filled with a buoyant substance.

U.S. Pat. No. 4,626,132, issued on Dec. 2, 1986 to S. J. Allen, teaches an oil containment barge assembly for containing an oil spill floating on a body of water. A plurality of barges are attached in end-to-end relationship around the spill. The open spaces between the barges are sealed by oil-impervious curtains suspended from the adjacent barges. A clamp means serves to hold the opposite end portions of the curtains flush against the corresponding inner sidewall surfaces of the adjacent barges.

U.S. Pat. No. 5,066,164, issued on Nov. 19, 1991 to G. Tomosy, shows a spill containment device for a ship that includes a pouch which is mounted on the outer, uppermost hull section. The pouch completely encircles the hull. A flexible fluid-impervious skirt is affixed along one edge to the interior of the pouch. The skirt is folded and stored within the pouch. When activated, the pouch is caused to fully open about its bottom by a deployment mechanism. The skirt is able to drop and depend down from the hull into the water.

U.S. Pat. No. 7,326,354, issued on Feb. 5, 2008 to R. C. Ferreira, describes an active barrier used to contain and collect polluting material floating over bodies of water. There is a plurality of containment modules which are interlinked to form the active barrier. Each containment module is provided with collecting tubes into which impeller modules displace in a predetermined direction. The displacement of the impeller modules causes a pumping effect of passing the polluted water into the collecting tubes.

U.S. Pat. No. 3,608,316 granted to James E. Manuel on Sep. 28, 1971 describes two pluralities of buoyancy chambers held together by a trough-like chamber containing a spring where the chamber serves a barrier skirt. The device is launched by vessels to encompass the spill area.

U.S. Pat. No. 3,839,870 published on Oct. 8, 1974 to Margaret M. Ryan provides a metallic retainer skirt made up of metal plates welded together on site. The metallic skirt retainer is held buoyant at the surface and in a vertical orientation by floatation pontoons. The skirt is anchored to the ocean floor by chains. The system may be lowered or raised for passage by visiting vessels through a series of air supply and water supply hoses connected to the pontoons and to the visiting vessel to submerge or surface the metallic retainer skirt where air and water are supplied by the visiting vessel.

SUMMARY

Prior art containment systems do not provide strong, safe and effective systems that can be positioned on-site so as to immediately contain a large oil spill on the high seas. Several problems with the prior technology result in lost time since the boom equipment must first be transported to the well site where it then requires additional time for assembly and installation. Once at the site, the boom must be assembled and towed in order to encircle areas of the spill, requiring further time. When the boom equipment is on-site at the offshore well, it might not be possible to deploy it properly because of the dangerous level of heat from the blowout fire. The deployment of any system by personnel on the rig may be hindered because of life threatening fires on the rig itself or near the rig site. Many prior art devices do not completely enclose the spill. Some devices permit oil leakage through openings at the connections of barrier segments. The inadequate strength of the supporting vertical, horizontal and diagonal members of the boom may not resist the wave action on the high seas.

Relative to the prior art, there remains a need for a submersible, self-positioning containment system that would encircle the offshore drilling rig at all times and thus could immediately capture oil spills of all sizes from offshore oil wells. A containment system of this type could be capable of being held in continuous submergence for reasons of safety with respect to marine surface traffic servicing the drilling rig during routine operations in addition to extreme surface weather conditions that might damage the system. It should be positioned on-site where it could be surfaced immediately to contain oil spills since spills are generally initiated by unexpected natural gas explosions. The system should be equipped with access gates to permit the passage of emergency vessels during times of a spill.

Generally, aspects of the present invention provide for containment of floating material in a body of water. More specifically, aspects of the present invention provide for containment of spills in bodies of water. One general embodiment includes a containment system for use in a body of water. The containment system may be deployed about at-risk infrastructure, such as, for example, a drilling rig, a petroleum product production facility, an underwater well, and so on as will occur to those of skill in the art.

One general embodiment of the present disclosure is a spill containment system for containing spills in a body of water. The system may include a barrier configured to encircle at-risk infrastructure ('ARI'); a ballast system coupled to the barrier and adapted to both submerge to a target depth upon receiving submerging signals and surface upon receiving surfacing signals; a deployment control system in operative communication with the ballast system. The ballast system may include a ballast vessel, such as a ballast tube. The deployment control system may be configured to send submerging signals to employ the ballast system to submerge to a standby depth for extended periods of nominal operating conditions and send surfacing signals to employ the ballast system to surface upon spill conditions. The system may also include a self-propulsion system coupled to the barrier and configured to maintain a minimum distance between the ARI and a portion of the barrier closest to the ARI.

The barrier may be adapted to extend its vertical profile upon surfacing. In some embodiments, the barrier comprises a curtain adapted to unroll upon the surfacing of the ballast system in spill conditions. In other embodiments, the barrier may include a curtain system coupled to the ballast system. The curtain system may include a curtain being movable between a rolled-up position during nominal operation and an unrolled position wherein the curtain is extended generally downward during spill conditions, the curtain being formed of a flexible non-metallic material; and a plurality of motors at the surface adapted to vertically move the curtain between the rolled-up position and the unrolled position. The curtain system may also include a stabilizer spool; and a curtain strap extending down one side of the curtain from an anchor point at an upper edge of the curtain, around the stabilizer spool, and back up to the electric motor, wherein the electric motor is adapted to unreel the curtain strap for curtain deployment and to reel in the curtain strap for curtain retraction. The bottom edge of the curtain may be connected to the stabilizer spool, and the curtain system may be configured such that in response to the electric motor reeling in the curtain strap, the curtain is lifted and rolled around the stabilizer spool such that the curtain is rolled up.

Further embodiments include a monitoring system configured to detect spill conditions. The control system may be configured to surface the ballast system in response to the monitoring system detecting the spill conditions. The barrier may be adapted to be vertically extended and the control system may be configured to extend the barrier in response to the monitoring system detecting the spill conditions.

Another general embodiment includes a modular spill containment system for containing spills in a body of water having a floor. The modular spill containment system may include a plurality of containment modules adapted for end-to-end connection, wherein each containment module comprises a barrier module; and a ballast module coupled to the barrier module. The ballast module may comprise a ballast vessel with an interior volume. The system may further comprise a pumping system for passing a fluid into the interior volumes of the ballast vessels and for passing water from the body of water into the ballast vessel; and a deployment control system in operative communication with the pumping system. The containment modules may be assembled to encircle at-risk infrastructure (ARI) and operatively coupled to the pumping system so that the pumping system is in fluid connection with the interior volume of the ballast vessels. The deployment control system may be configured to send submerging signals to employ the pumping system to pass water from the body of water into the ballast tube so as to lower the ballast tube to a standby depth above the floor of the body of water and below a surface of the body of water for extended periods of nominal operating conditions; and send surfacing signals to employ the pumping system to pass a fluid into the interior volume of the ballast vessels so as to raise the ballast vessels to the surface of the body of water upon spill conditions.

Another general embodiment includes a method of containing spills from at-risk infrastructure in a body of water. The method may include, prior to a spill, maintaining a containment barrier in a submerged position encircling at-risk infrastructure (ARI); monitoring for deployment conditions; upon detecting deployment conditions, deploying the barrier to a surface position; and maintaining a minimum distance between the ARI and a portion of the barrier closest to the ARI. The method may further include expanding the vertical profile of the barrier. The barrier may be a curtain. Expanding the vertical profile of the barrier may be carried out by unrolling the curtain.

Deployment conditions may include events such as, for example, a spill (e.g., an oil spill), an explosion at the ARI, or a failure or some portion or all of the ARI (ARI failure). Deployment conditions may also include circumstances upon which any of the above events are determined to be imminent or upon the determination of a heightened risk of occurrence of one the above events.

Maintaining a minimum distance between the ARI and a portion of the barrier closest to the ARI may be carried out by employing a coupled propulsion system to maintain the minimum distance. Employing the propulsion system to maintain the minimum distance may include employing the propulsion system to counteract prevailing ocean currents or weather at the ARI location, comparing one or more sets of target coordinates to corresponding actual coordinates obtained through at least one satellite global positioning system, and so on.

The present disclosure serves to correct for the shortcomings of the prior art since it provides a submersible device that can constantly encircle the offshore drilling rig and can be immediately surfaced when required to contain oil spills from the rig. The containment system can maintain a specific location by use of thruster units that are guided by satellite systems in order to continuously monitor the rig. Continuous onsite monitoring is beneficial since most oil spills are the result of natural gas explosions on the rig floor and demand immediate and total spill control action.

The oil containment system of the present disclosure utilizes an encompassing plurality of ballast tubes or tanks surrounding the offshore drilling rig. The ballast tubes may be joined to each other by thruster units. The plurality of ballast tubes arranged so as to define a perimeter of a containment area where are positioned a plurality of service vessels and a plurality of marine propulsion units. The plurality of ballast tubes having an access gate positioned at the juncture of the marine propulsion unit and the ballast tube to permit the passage of vessels during times of emergency to and from the contained area as defined by the circular pattern of ballast tubes when the containment system is at the surface of the body of water.

The ballast tubes are fastened horizontally to the top of the oil retainer curtain. The bottom of the curtain is fastened horizontally to a horizontal rigid member upon which the curtain may be rolled up or down with remote-controlled power equipment while the system is deployed in the water. The rolled up curtain in the retracted mode reduces the profile of the curtain to ocean currents so as to minimize the effects of ocean current forces and reduce fuel usage when the system is positioned in the water. In retrieving the system, the retainer curtain and connected ballast tubes may be retracted by rolling and storing the curtain and tubes in a housing that is mounted on the deck of the service vessel. The retainer curtain and connected ballast tubes can also be positioned at a selected subsurface location with the assistance of the thruster units. The retainer curtain and connected ballast tubes can be unrolled into the water by electric motors to a horizontal position when the system is deployed and the curtain is extended in order to serve as a barrier for oil spills. Sea water and air serve as the control ballast. Water is injected into the ballast tubes by pumps for submergence to a specific level and is pumped from the ballast tubes and displaced with air for surfacing. The submerged system avoids surface marine traffic, poor weather conditions and other adverse surface conditions. The retainer system contains access gates for the entry and exit of fireboats and other emergency vessels when the container system is positioned at the surface and activated.

The positioning of the containment system may be accomplished by a plurality of thruster units connected along the length of the ballast tubes that encircle the drilling rig. These thruster units can impart hydraulic forces in any horizontal direction of a sufficient magnitude as to move the system. The thruster units may receive positioning signals based on satellite communications. These signals provide the necessary degree of accuracy required to guide the thruster units for the containment system to precisely encompass the offshore drilling rig at all times. Positioning can also be accomplished by anchors when the seabed conditions are suitable. The containment system may also be tethered to the offshore drilling rig, when possible.

A plurality of service vessels can be moored to the outside of the containment system. A plurality of thruster units may be built into the containment system through a series of thruster unit platforms that connect the ballast tubes through couplings and that provide buoyant support of the thruster units. The thruster units can provide hydraulic force in any desired horizontal direction. The service vessels can provide electric power for communications, the curtain remote-controlled power equipment, the ballast tube housing motors, the ballast tube water pumps, the air compressors and the thruster units. In some embodiments, the containment system comprises a ballast tube, a pumping system cooperative with an interior volume of the ballast tube for passing a fluid into or out of the ballast tube so as to raise or lower the ballast tube relative to a surface of the body of water, and a curtain connected or interconnected to the ballast tube. The containment system is equipped with an emergency floatation system in the event of an accidental loss of buoyancy. The containment system may be formed primarily of a non-metallic material.

The ballast tube may comprise a plurality of ballast tubes that are arranged so as to define a perimeter of a containment area. The plurality of ballast tubes may be arranged in a generally circular pattern. The ballast tubes may include a first array of ballast tubes arranged in a generally circular pattern and a second array of ballast tubes arranged in a generally circular pattern. The second array of ballast tubes may be positioned inwardly of the first array of ballast tubes in a generally concentric relation therewith and attached to the first array of ballast tubes. Additional ballast tube arrays may be positioned inwardly from the second array of ballast tubes and in the same configuration.

The oil retainer curtain may be affixed to one of the ballast tube arrays so as to provide a continuous generally circular barrier for the purpose of holding oil spills. The curtain and ballast tube array can be stored in a housing aboard a service vessel on site. The curtain and ballast tube array can also be deployed in a selected submerged or surfaced location. While deployed in the submerged or surfaced location the curtain may be raised or lowered by vertically rolling up or unrolling the curtain onto a rigid member located horizontally at the bottom of the curtain that serves as both a reel and a stabilizing counterweight.

Marine propulsion units may be connected to the ballast tubes in some embodiments. The service vessels and propulsion units, or thruster units, discharge seawater with such a horizontal force as to be suitable for moving the ballast tube in the body of water. The propulsion units, or thruster units, discharge seawater in any horizontal direction and can thus move the ballast tube to a desired position in the body of water and can retain that position in the presence of ocean currents. A navigation system cooperative with the thruster unit may also be included. The navigation unit may process a signal so as to control the location of the thruster unit. In particular, the navigating system can process global positioning satellite signals so as to assure that the containment system is positioned and continues to be positioned at a desired location in the body of water.

The pumping system of the present invention serves to evacuate the ballast tube of water and to pass air into the ballast tube so as to move the ballast tube to a surface of the body of water. The pumping system can flood the ballast tube with a specified amount of water and can evacuate the ballast tube of air so as to lower the ballast tube to a desired level in the body of water. The service vessel can be positioned adjacent the ballast tube. This vessel can be suitable for supplying electricity, air, water and other requirements to the pumping system and the ballast tube.

Another general embodiment includes a containment system for use in a body of water. The system includes a ballast tube having an interior volume, the ballast tube comprising a plurality of ballast tubes arranged so as to define a perimeter of a containment area, the plurality of ballast tubes being formed of a flexible non-metallic material; a pumping system cooperative with the interior volume of the ballast tube, the pumping system for passing a fluid into the interior volume of the ballast tube so as to raise the ballast tube to a surface of the body of water and for passing water from the body of water into the ballast tube so as to lower the ballast tube into a desired horizontal position above the floor of the body of water and below the surface of the body of water; a curtain connected to or interconnected to the ballast tube, the curtain and the ballast tube being horizontally movable between a rolled-up position and an unrolled position, the curtain and the ballast tube extending generally horizontally when in the unrolled position; and a motor connected to the end of the curtain and to the end of the ballast tube so as to horizontally move the curtain and the ballast tube reelably between the rolled-up position where the curtain and the ballast tube are stored and the unrolled position where the curtain and the ballast tube are made ready in a horizontal position for oil retainer service in the sea; a curtain connected to or interconnected to the ballast tube, the curtain being movable between a retracted position and a deployed position, the curtain extending generally vertically when in the deployed position, the curtain being formed of a flexible non-metallic material; and a motor connected to the top of the curtain so as to vertically move the curtain reelably between the retracted position where the curtain is stored and the deployed position where the curtain is extended and made ready in a vertical position for oil retainer service in the sea.

The plurality of ballast tubes may be arranged in a substantially circular pattern or may be elliptical or oval in shape. There may be a first plurality of ballast tubes arranged in a generally circular pattern; a second plurality of ballast tubes arranged in a generally circular pattern and positioned inwardly of, and connected to the first array of ballast tubes in generally concentric relation therewith; and additional ballast tube arrays arranged in a generally circular pattern and positioned inwardly of the second array of ballast tubes in generally concentric relation therewith, with all arrays of ballast tubes being connected to one another. The system may also include a plurality of service vessels connected or interconnected to the ballast tube, the service vessels suitable for moving the curtain and the ballast tube to a desired location in the body of water; and a plurality of marine propulsion units connected or interconnected to the ballast tube, the marine propulsion units suitable for moving the curtain and the ballast tube to a desired location in the body of water. The system may further include a navigating system cooperative with the service vessel and the marine propulsion unit, the navigating system for processing a signal so as to control the horizontal movement of the service vessel and the marine propulsion unit. The system may include a service vessel positioned adjacent the ballast tube, the service vessel suitable for supplying electricity, seawater and air to the system.

In other embodiments, the containment system for use in a body of water, having a floor, the containment system comprising a ballast tube having an interior volume; a pumping system cooperative with the interior volume of the ballast tube, the pumping system for passing a fluid into the interior volume of the ballast tube so as to raise the ballast tube toward a surface of the body of water and for passing water from the body of water into the interior volume of the ballast tube so as to lower the ballast tube to a desired horizontal position relative to the surface of the body of water; a curtain connected to or interconnected to the ballast tube, the curtain and the ballast tube being movable between a rolled-up position and an unrolled position, the curtain and the ballast tube extending generally horizontally when in the unrolled position; a service vessel containing a housing, the housing connected or interconnected to the curtain and to the ballast tube, the housing receiving the curtain and the ballast tube when the curtain and the ballast tube are in the rolled-up and stored position; and a motor contained in, and connected to the housing so as to move the curtain and the ballast tube reelably between the rolled-up position and the unrolled position.

In other embodiments, the containment system includes a ballast tube having an interior volume; a curtain connected to or interconnected to the ballast tube, the curtain and the ballast tube being horizontally movable between a rolled-up position and an unrolled position, the curtain and the ballast tube extending generally horizontally when in the unrolled position; and a motor cooperative with the curtain and the ballast tube for horizontally moving the curtain and the ballast tube reelably between the unrolled position where the curtain and the ballast tube are submerged, and a surfaced location and where the curtain and the ballast tube are rolled-up and stored; and a service vessel containing a housing connected to or interconnected to the curtain and the ballast tube, the curtain and the ballast tube being received in the housing when in the rolled-up position for storage.

The containment systems and methods of the present disclosure serve to effectively protect the offshore environment. If properly deployed, the containment system would have effectively prevented the damage that resulted from the enormous BP-Macondo oil spill of April, 2010. The present invention also results in energy conservation by retaining and saving the spilled oil. For example, the BP-Macondo spill resulted in the total loss of most of the 4,900,000 barrels of oil spilled or about 22% of one day's consumption for the entire United States. This loss would not have occurred if the containment system of the present disclosure had been employed. Additionally, the present invention results in the avoidance of monetary loss. The BP-Macondo well value of the spill would be worth about $382,000,000 with a minimum financial exposure to BP of $21,000,000,000. The present invention would have avoided such a loss. There have been several serious oil spills throughout the world since the Macondo well spill.

The present containment system could be constructed to have a radius, for example, of 900 feet with a curtain height of about 10 feet. Such a retainer could contain a volume of about 4,900,000 barrels of oil or a spill similar to the Macondo well. At a spillage rate of 60,000 barrels per day, or about the same rate as the Macondo well, the time interval required to reach the 4,900,000 barrel spill volume would be some 82 days which would provide sufficient time for the blowout to be contained and the spill to be removed from the present invention by oil recovery tankers.

In some embodiments, the system is designed to maintain a specific location despite ocean currents or weather using self-contained marine propulsion equipment, such as, for example, thruster units, to exert force whether the system is submerged or surfaced. A self-positioning feature may be connected to the thruster units, so that the navigation would be controlled by a satellite positioning system to ensure a high degree of accuracy considering its proximity to the offshore drilling rig and safety requirements for personnel. During the long periods of surveillance not involving spills, the submerged vertical oil spill retainer curtain may be retractable in order to reduce the amount of curtain area exposed to forces from ocean currents. A retractable curtain would thus significantly reduce the fuel required to maintain the system position. The system may also be capable of moving to adjacent positions should the oil escaping from the well, or the rig itself, change its location. In the event of multiple spills, the system may be reconfigured to form several enclosures.

The foregoing and other objects, features and advantages of the disclosure will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The following figures are part of the present specification, included to demonstrate certain aspects of embodiments of the present disclosure and referenced in the detailed description herein.

FIGS. 2A and 2B are a cross sectional views of a containment system in accordance with embodiments of the invention.

DETAILED DESCRIPTION

Figure 1:
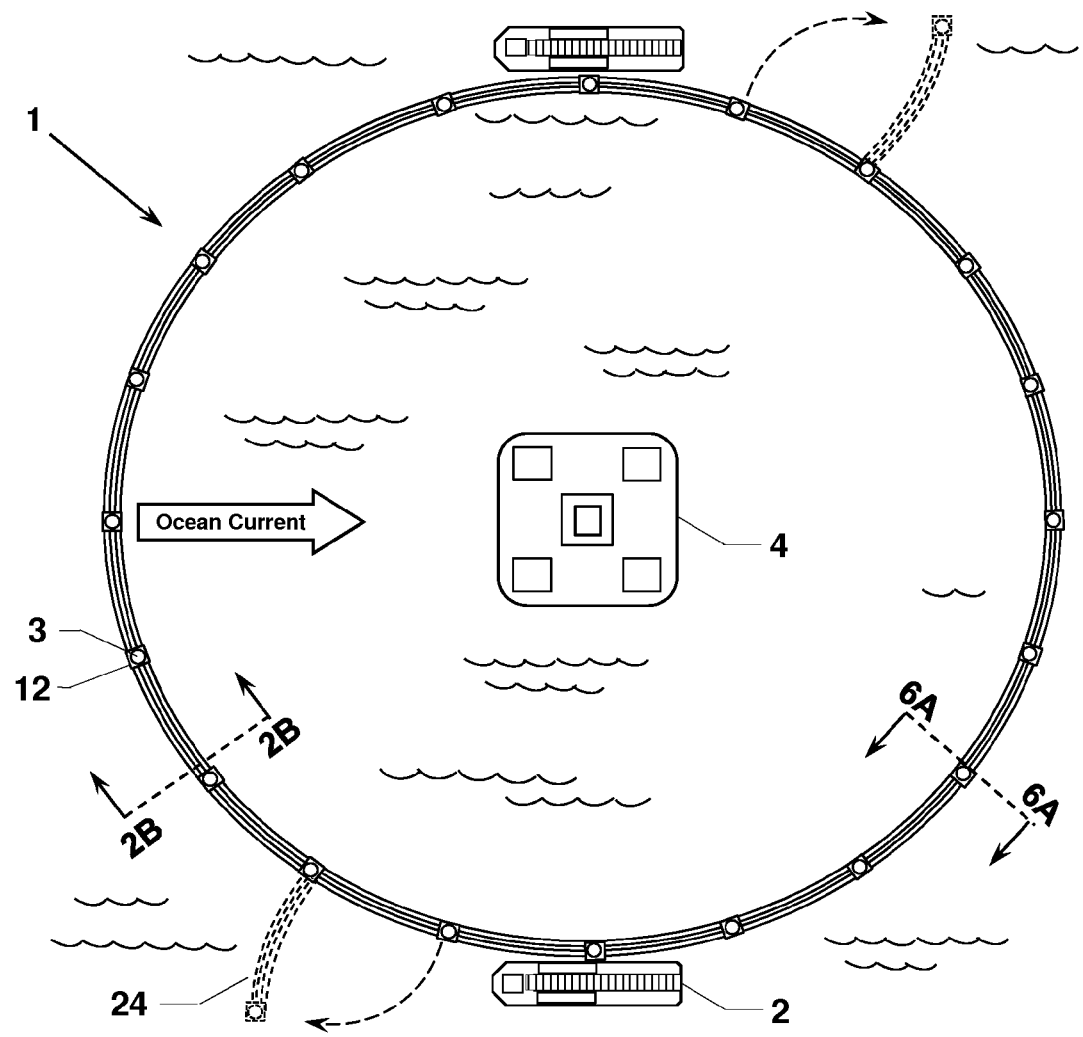
FIG. 1 is a plan view of the containment system in accordance with embodiments of the invention.

The principles of the invention are explained by describing in detail, specific example embodiments of devices, systems and methods for containing spills in a body of water. Those skilled in the art will understand, however, that the invention may be embodied as many other devices, systems, and methods. Many modifications and variations will be apparent to those of ordinary skill in the art. Embodiments were chosen and described in order to best explain the principles of the invention and the practical application, and to enable others of ordinary skill in the art to understand the invention for various embodiments with various modifications as are suited to the particular use contemplated. The scope of the invention is not intended to be limited by the details of exemplary embodiments described herein. The scope of the invention should be determined through study of the appended claims.

Aspects of the present invention are described below with reference to flowchart illustrations and/or block diagrams of methods according to embodiments of the invention. Specific design details have been provided for illustration, but should not be considered limiting. Readers of skill in the art will recognize that many variations of containment systems may be implemented consistent with the scope of the invention as described by the appended claims.

Generally, aspects of the disclosure concern the retention of lighter-than-water liquids or solids by a containment system in high seas, lagoons, lakes, rivers, reservoirs and other bodies of water. The containment system utilizes ballast system including a plurality of interconnected ballast tubes that can be self-positioned and submersible. The containment system of the present invention should be of sufficient size to encircle and continuously monitor offshore drilling rigs for potential spills while located onsite in order to provide immediate containment action. The containment system of the present invention can include a curtain that can be mounted vertically along the horizontal length of the ballast tubes such that a portion of the curtain is above the water and the remainder is below the water. It is contemplated that the containment system be formed of a non-metallic material. The containment system of the present disclosure can be positioned encircling the offshore drilling rig and sufficiently far from the rig so as to not be affected by explosions or fire. The containment system can retain spills so as to prevent any spreading that could cause significant environmental and economic damage. Aspects of the present disclosure are unique in that they provide a system that is self-positioning, submersible, offers continuous monitoring and can immediately contain oil spills. This containment system is mobile through the use of service vessels and water propulsion equipment, or thruster units, located around the system perimeter. Further, the system also has a retractable retainer curtain to reduce fuel costs. It has access gates to permit the entry and exit of emergency vessels during a spill. Since the containment system is self-propelled, it can be moved to an adjacent location should the oil escaping from the well change its direction of movement. If several spills were to develop in different areas around the rig, the containment system of the present invention can be reconfigured to create several separate and smaller containment systems. The containment system is equipped with an emergency floatation system in the event of an accidental loss of buoyancy.

FIG. 1 is a plan view showing the containment system 1 of the present invention. Electric power, water and air to the containment system 1 are supplied by a plurality of service vessels 2.

Maintaining a minimum distance between the offshore drilling rig 4, an at-risk infrastructure, and a portion of the barrier closest to the ARI may be carried out by employing a coupled propulsion system to maintain the minimum distance. Employing the propulsion system to maintain the minimum distance may include employing the propulsion system to counteract prevailing ocean currents or weather at the ARI location. Employing the propulsion system to counteract at least one of the group consisting of prevailing ocean currents at the ARI location and weather at the ARI location may be carried out by employing the propulsion system in response to an ocean current metric (e.g., speed and/or direction at a specific depth and at specific coordinates) or a weather metric (wind speed and direction, wave strength and direction, and so on).

Thruster units 3 and thruster unit platforms 12 are connected to the containment system 1. In operation, thruster units 3 maintain the containment system 1 in a desired position. Service vessels 2 may be used in the place of or in addition to thruster units 3 for maintaining the containment system 1 in a desired position. The thruster units 3 are capable of moving in any horizontal direction by means of discharging water with such force as to maintain a desired location. The location of the thruster units 3 can be controlled through the use of global positioning satellite navigation in order to perform continuous surveillance on-site of the offshore drilling rig 4. As can be seen from FIG. 1, the positioning of service vessels 2 allows the complete visual surveillance of containment system 1. Access gates 24 are provided for the passage of emergency vessels such as personnel carriers and fire boats during critical times of an oil spill while the containment system is surfaced. Access gates 24 are motivated by thruster units 3 located at the open end of gates 24 and are remotely controlled from service vessels 2. In FIG. 1, it can be seen that the containment system 1 is at the surface of the body of water and is in a suitable position for retaining oil spills. In normal use during surveillance operations, the containment system 1 will be submerged at a specified level or it can later be stored aboard the service vessel 2. While submerged, the containment system 1 may only surface for periodic testing and for actual oil spills.

As can be seen in the cross sections of FIG. 2A and FIG. 2B the containment system 1 is formed of a ballast system including plurality of ballast tubes 5, air vent and electric cable tubes 6, and water supply tubes 7; and a barrier comprising a curtain 8, stabilizer 9, curtain straps 10, and electric motor and housing 11. The ballast tubes 5 are connected in an end-to-end relationship making up a major part of the containment system 1 so as to form a perimeter of the containment area as shown in FIG. 1. The ballast tubes 5 extend in a generally horizontal plane. The ballast tubes 5 may be flooded or evacuated of seawater independently in order to maintain the containment system 1 at a specified vertical level, whether submerged or partially submerged. FIG. 2A illustrates a cross section of the containment system 1 in a submerged configuration. The ballast tubes 5, configured to contain variable amounts of water from the body of water, are affixed to curtain 8. Ballast tubes 5 are partially filled with seawater. As such, the containment system 1 is submerged. The ballast water level in ballast tubes 5 is individually controlled by a deployment control system in operative communication with the ballast system. The water supply tubes 7 are mounted to the top of the ballast tubes 5 and provide water from the body of water (e.g., seawater) to the ballast tubes 5 for purposes of submergence. Water supply tubes 7 also serve as a conduit to expel ballast water from ballast tubes 5 during surfacing operations. Air vent and electric cable tubes 6 are mounted to the top and along the length of the water supply tubes 7 and provide power and compressed air to the ballast tubes 5 for surfacing containment system 1. The air vent and electric cable tubes 6 also can provide an air passage when it is necessary to evacuate the ballast tubes 5 of air for submergence of the containment system 1.

FIG. 2A shows the containment system in the standby, or "stand ready", position, submerged below the surface of the body of water at a standby depth. As can be seen, the water level within the ballast tube 5 is sufficiently high so as to suitably weight the containment system for submergence. The ballast tube 5 may be maintained in a generally horizontal submerged position with the curtain 8 in a rolled-up and retracted position as shown in FIG. 2A. The stabilizer 9 contains weights to help maintain curtain 8 in a vertical position when lowered and also serves as a horizontal spool upon which the curtain 8 may be rolled-up for purposes of refraction and storage, as shown in FIG. 2A. The containment system 1 may be maintained in a submerged horizontal position at a specified subsea depth in order to avoid surface marine traffic, wave action and any adverse weather conditions. The ballast tube 5 and the curtain 8 may also be stored in a housing aboard the service vessel 2. In order to submerge the containment system 1 to the desired subsea level, water is injected into the ballast tubes 5 through water supply tubes 7 by means of pumps. Displaced air is collected through the air vent and electric cable tubes 6.

FIG. 2A also illustrates the containment system 1 in a standby configuration, with curtain 8 in the retracted position following its rolling-up upon stabilizer 9. The rolling-up up of curtain 8 on the stabilizer 9, which serves as a spool, to its retracted position can be done with curtain strap 10 that is moved vertically up by the electric motor and housing 11. The curtain 8 is lifted and rolled around stabilizer 9 when the curtain strap 10 is rolled up by electric motor and housing 11. Curtain strap 10 is anchored to the upper right side of curtain 8 as shown in FIG. 2A, then extends vertically downward on the right side of curtain 8 and around stabilizer 9, thence extends vertically upward on the left side of curtain 8 and is then connected to the electric motor and housing 11 where curtain strap 10 is stored. Retraction of curtain strap 10 into electric and motor housing causes the curtain 8 to move rotationally around stabilizer 9 into a rolled-up position as illustrated in FIG. 2A. The curtain strap 10 is stored in a rolled-up position in the electric motor and housing 11 when fully retracted as shown in FIG. 2A. In the retracted position, the curtain significantly reduces fuel requirements (for example, by up to 80% or more) since the retracted curtain 8 will expose a much lower areal profile to ocean current forces, thus requiring much less electric power for positioning by thruster units 3 and supply vessels 2.

FIG. 2B shows the containment system 1 in the deployed position at the surface of the body of water. As can be seen in FIG. 2B, most of the ballast water has been removed from the ballast tubes 5. As can be seen, the water level is relatively low within the ballast tubes 5. In order to surface the containment system 1 as shown in FIG. 2A, the ballast tube 5 will be evacuated of ballast water by pumps and simultaneously filled with air from air compressors. The water pumps and air compressors are located aboard the service vessel 2. The air can be injected through the air vent and electric cable tubes 6. The ballast water can be evacuated through water supply tubes 7.

As shown in FIG. 2B, weights are placed in stabilizer 9 in order to assist in raining the curtain 8 in a vertical position. Stabilizer 9 also serves as a spool for curtain 8 while retracted as in FIG. 2A. The curtain 8 can be comprised of a series of non-metallic, elongate rectangular sheet-like flexible barriers that are joined end-to-end by a plurality of marine zippers. FIG. 2B also illustrates the containment system in a deployed configuration, having an expanded vertical profile, with curtain 8 in the extended position following its unrolling from stabilizer 9 through the lowering of curtain straps 10 from the electric motor and housing 11. The lowering of curtain 8 from stabilizer 9, which acts as a spool, can be done with the curtain straps 10 that are lowered vertically down by remote control of the electric motors in the electric motor and housing 11. The combined profile of the ballast tube 5, water supply tube 7 and air vent and electric cable tube 6 serve as the barrier for surface oil spill. The curtain 8 serves as the primary barrier for subsurface oil spill.

Figure 3:
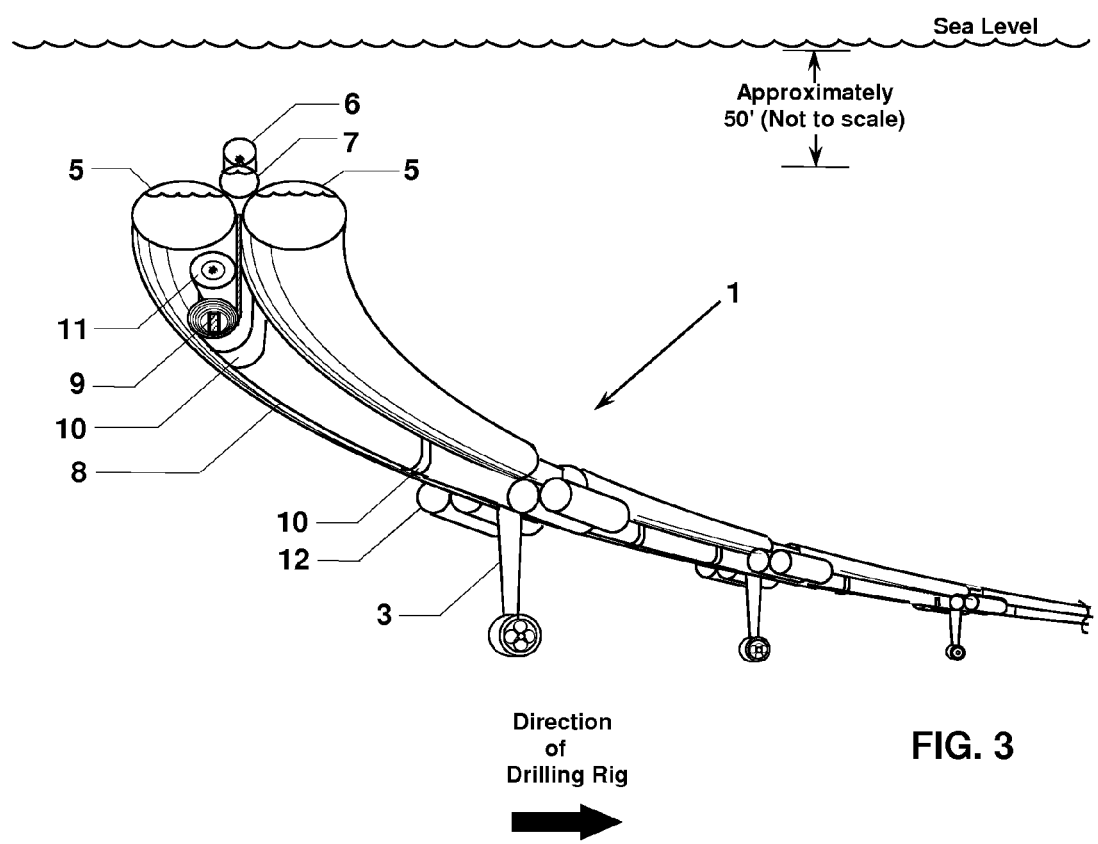
FIG. 3 is a bottom perspective view and end cross sectional view of a containment system showing a retracted curtain in accordance with embodiments of the invention.

FIG. 3 is an underwater perspective view and end cross-sectional view of a portion of the containment system 1 in the submerged position. FIG. 3 shows the orientation of the ballast tubes 5 that are attached to the length of curtain 8. Curtain 8 is attached to the length of stabilizer 9 such that ballast tubes 5, curtain 8 and stabilizer 9 extend the length of the containment system in a connecting fashion. Curtain 8 is rolled around stabilizer 9 into the refracted position in this view. Thruster unit 3 and thruster unit platform 12 are shown connected to the ballast tube 5. The air vent and electric cable tube 6 and water supply tube 7 are illustrated as extending connected along the upper portion of the containment system 1. The curtain strap 10 is shown to be fully retracted into the electric motor and housing 11. As can be seen in FIG. 3, the containment system 1 is submerged to a specified subsea level below surface marine traffic, adverse weather and wave action. The containment system 1 is removed from harm's way. In FIG. 3, the system is illustrated in a "standby" submerged position. It can remain in this position during continuous monitoring of the offshore drilling rig 4.

Figure 4:
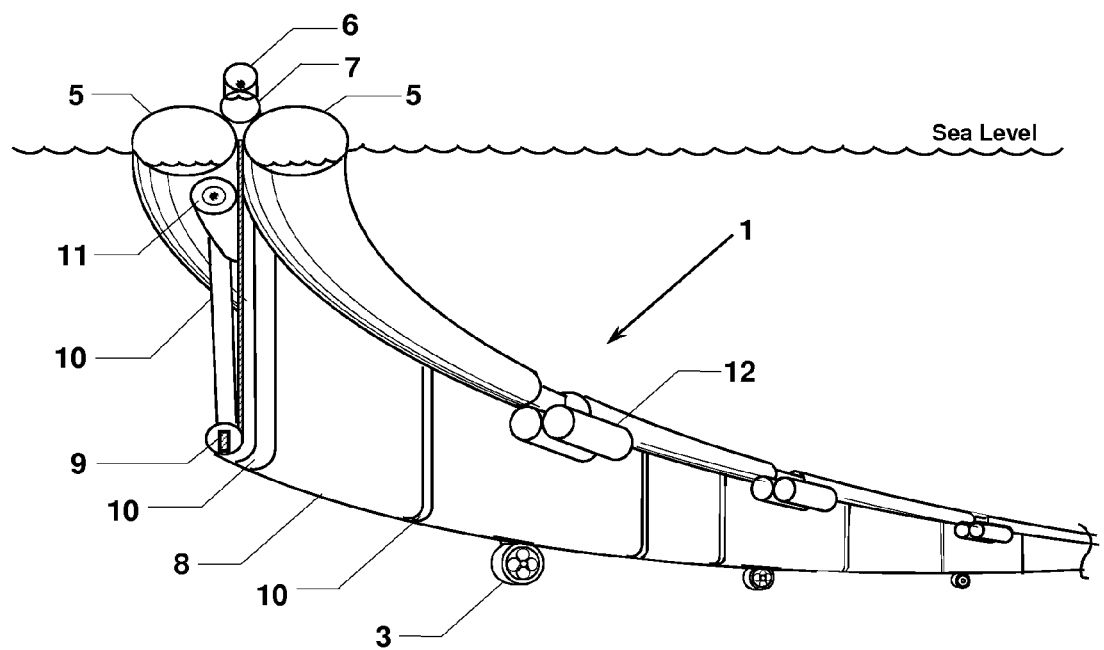
FIG. 4 is a bottom perspective view and end cross sectional view of a containment system in accordance with embodiments of the invention showing an extended curtain in a surface deployed position and prior to an oil spill.

FIG. 4 is a perspective view showing the containment system 1 in the surfaced position. The curtain 8 has been extended from its retracted position so as to be fully deployed vertically. In some embodiments, thruster unit 3 protrudes sufficiently below curtain 8 so as to discharge water below curtain 8. The air vent and electric cable tube 6 and water supply tube 7 are illustrated as extending along the upper portion of the containment system 1. The ballast tubes 5 are located above curtain 8 and are connected to the length of curtain 8. The stabilizer 9 is illustrated at the bottom of curtain 8 and is connected to the length of curtain 8. The curtain strap 10 is shown to be fully extended from the electric motor and housing 11.

Figure 5A:
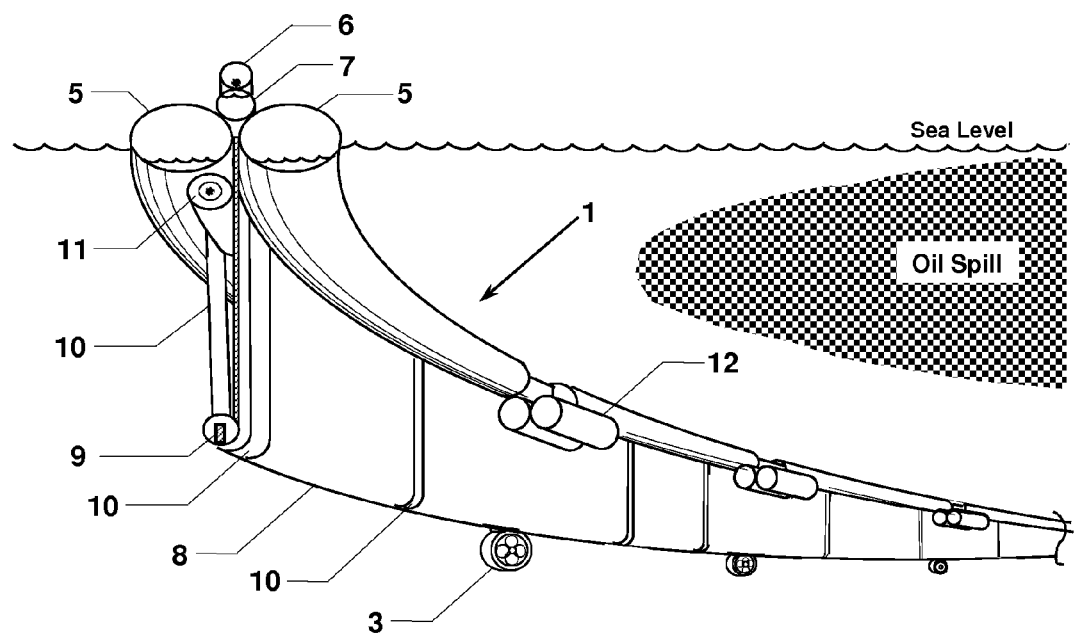
FIG. 5A is a data flow diagram illustrating a system in accordance with embodiments of the invention.

FIG. 5A is identical to FIG. 4 except that curtain 8 is illustrated as positioned in order to contain the large oil spill emerging from the right side of the illustration of FIG. 5 and is indicated by the dark shading. The curtain 8 has been extended from its retracted position so as to be fully deployed vertically. The thruster unit 3 is mounted on thruster unit platform 12 connected to the ballast tube 5. Thruster unit 3 protrudes sufficiently below curtain 8 so as to discharge water below curtain 8. The air vent and electric cable tube 6 and water supply tube 7 are illustrated as extending along the upper portion of the containment system 1. The ballast tubes 5 are located above, and are connected to the length of curtain 8. The stabilizer 9 is illustrated at the bottom of, and connected to the length of curtain 8. The curtain strap 10 is shown to be fully extended from the electric motor and housing 11.

Figure 5B:
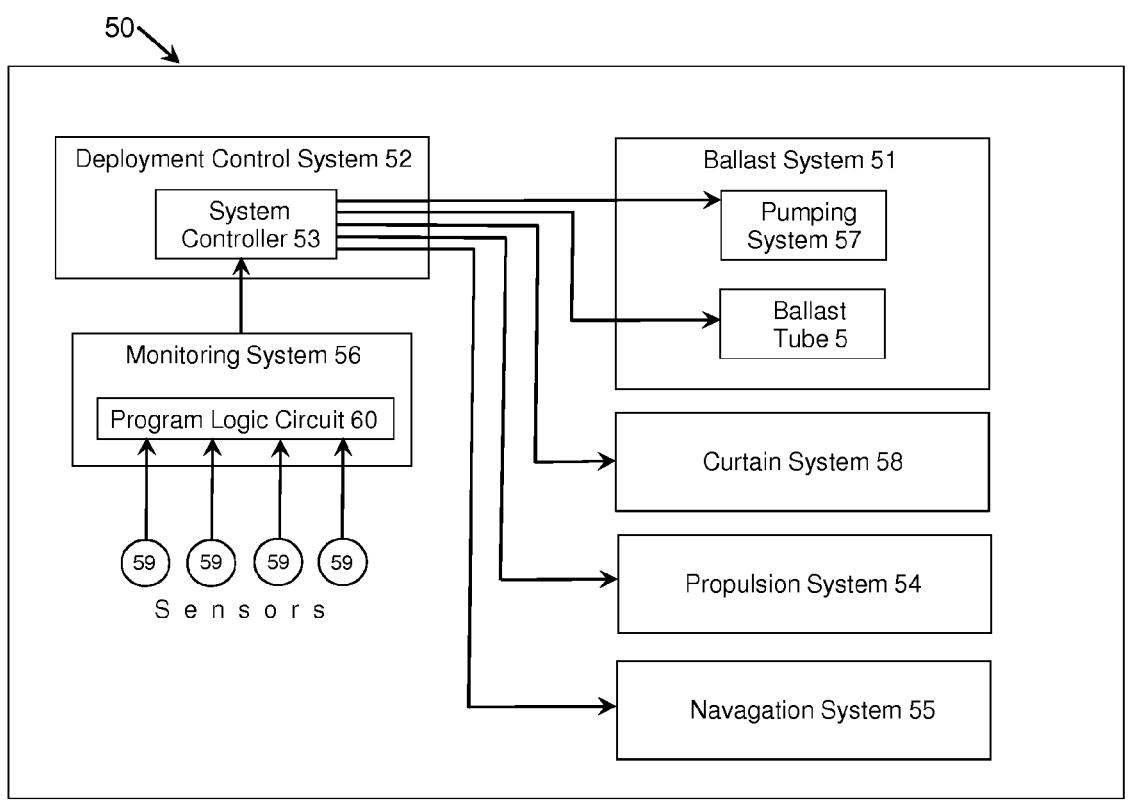
FIG. 5B is a bottom perspective view and end cross sectional view of the containment system of the present invention showing the curtain in a surface deployed position and during an oil spill. The curtain is extended for containment in this view.

FIG. 5B illustrates a system view of a containment system in accordance with embodiments of the present disclosure. The containment system control 50 includes a monitoring system 56 comprising a programmed logic circuit 60 and a plurality of sensors 59 for detecting deployment conditions. Sensors 59 detect conditions at and around the at-risk infrastructure ('ARI') and are operatively coupled to the programmed logic circuit 60. The sensors 59 deliver information to the programmed logic circuit 60 indicative of the operating state of the ARI. The operating state may include either nominal operating conditions or deployment conditions, as discussed above. For example, sensor 59 may transmit signals reflecting that a blowout has occurred. The sensor 59 may transmit information as analog or digital signals utilizing parallel or serial transfer, and may be transmitted as data packets. The signals may be implemented in any manner as will occur to one of skill in the art.

The programmed logic circuit 60 further includes a memory (not shown) storing a data structure associating received signal values with an operating condition value. The programmed logic circuit 60 includes a memory access circuit (not shown) operatively coupled to the memory configured to access the data structure and return the operating condition value associated with the operating state. The monitoring system 56 may transmit the operating condition value to a deployment control system 52.

A system controller 53 of the deployment control system 52 may receive operating condition values from monitoring system 56. The system controller 53 may be adapted to send submerging signals to components of the ballast system 51, such as the pumping system 57, to employ the ballast system 51 to submerge to a standby depth for extended periods when the condition values reflect nominal operating conditions, and to send surfacing signals to components of the ballast system 51 to employ the ballast system to surface when the condition values reflect spill conditions. The system controller 53 may further send signals to curtain system 58 to employ one or more motors of curtain system 58 to extend the curtain to a fully deployed configuration. The system controller 53 may further send signals to the propulsion system 54 to engage the propulsion system. The system controller 53 may also send signals to the navigation system 55 to provide navigation information.

The memory access circuit may be implemented completely in hardware, or as software modules executing on one or more embedded processors, or an embodiment combining hardware and software aspects. Memory may be embedded in programmed logic circuit 60 in whole or in part, or may be a separate element operatively coupled to programmed logic circuit 60. Memory may include any forms of volatile random access memory ('RAM') and some form or forms of non-volatile computer memory such as a hard disk drive, an optical disk drive, or an electrically erasable programmable read-only memory space (also known as 'EEPROM' or 'Flash' memory), or other forms of non-volatile random access memory ('RAM').

Although elements of the embodiments above are described as part of the system controller 53 or logic circuit 60, in other embodiments, some or all of the elements may be implemented as a master controller (not shown), or as separate controllers or modules operatively coupled to the system controller 53. Signals indicating a spill may be sent from either the offshore drilling rig 4 or the service vessels 2. Said signals may be activated manually or by sensors 59.

As will be appreciated by one of skill in the art, elements of the system may be implemented as a completely hardware embodiment, as software (including firmware or microcode), or as a combination of hardware and software, all of which are referred to herein as "circuits" or "modules". The system controller 53, for example, may be implemented as several hardwired circuits, as design structures implemented on one or more Application Specific Integrated Circuits ('ASICs'), as a design structure core, as one or more software modules executing on any number of embedded processors, workstations or system computers, or a combination of any of these.

Figure 6A:
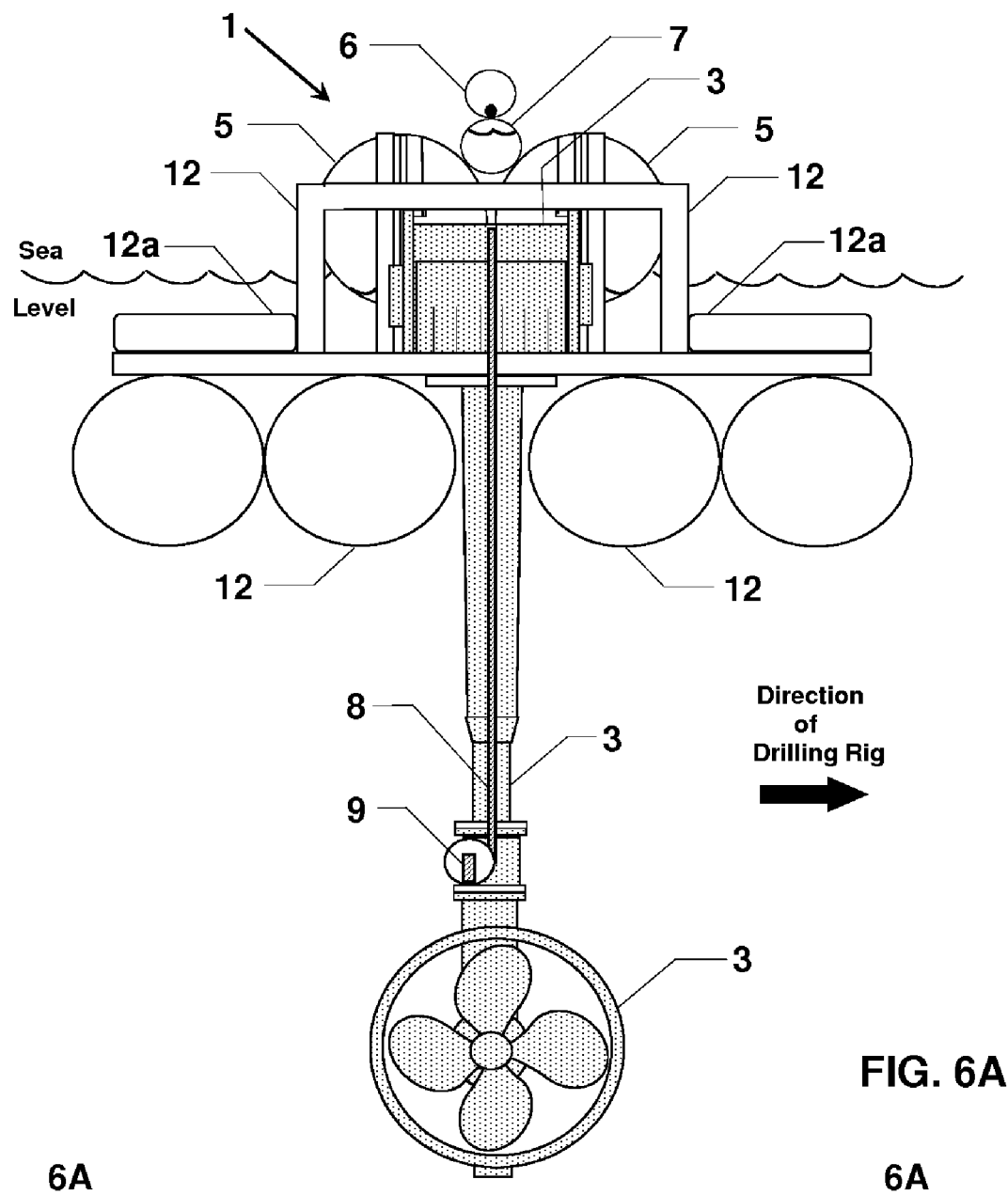
FIG. 6A is a cross sectional view taken through line 6A-6A of FIG. 1 and shows a frontal view of a thruster unit and ballast tubes in accordance with embodiments of the invention.

FIG. 6A shows a cross section view of thruster unit 3 and thruster unit platform 12 as taken from the line 6A-6A of FIG. 1, with respect to ballast tube 5, curtain 8, stabilizer 9, air vent and electric cable tube 6, water supply tube 7 and emergency floatation system 12a. Ballast tubes 5 are connected to curtain 8 as shown. The emergency floatation system 12a would be used in the event of an accidental loss of buoyancy and can be remotely activated automatically or manually. Thruster unit 3 is capable of rotating horizontally through a complete circular motion and thus may eject water to propel the system 1 in any horizontal direction while the system 1 is submerged or surfaced.

Figure 6B:
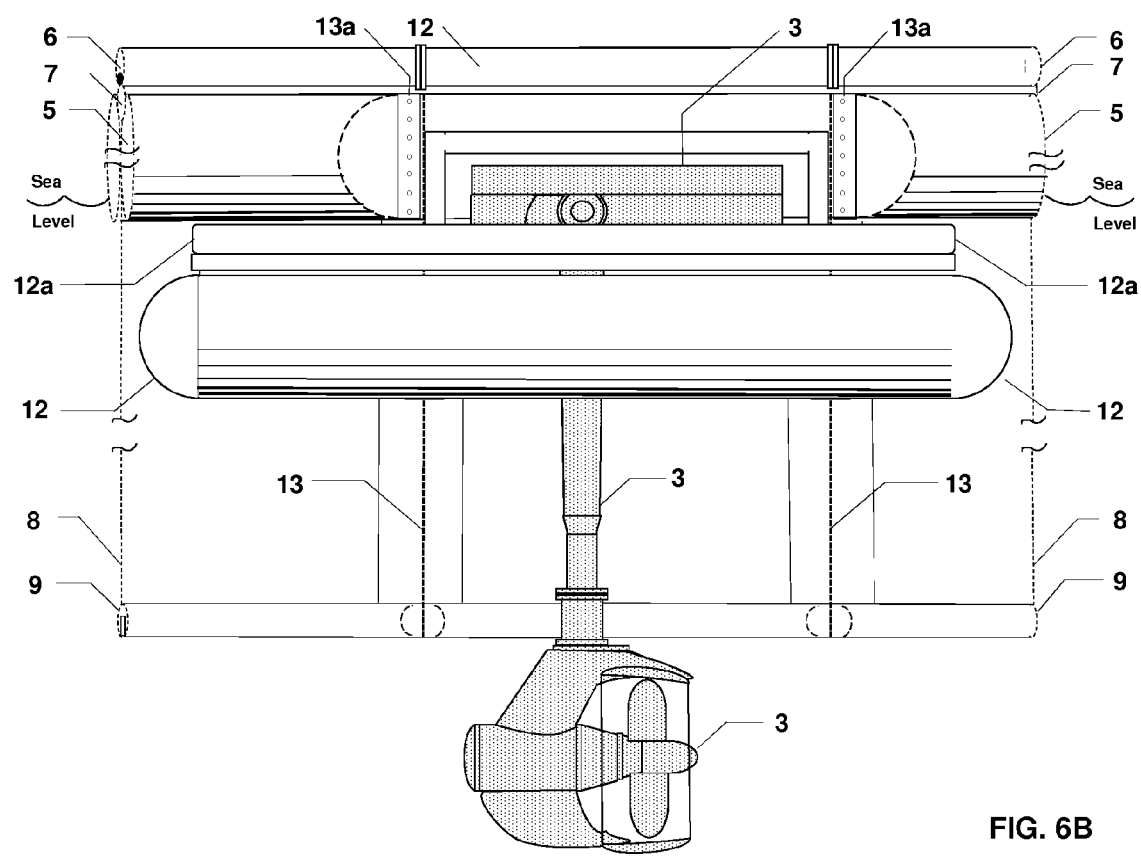
FIG. 6B is a side view of a thruster unit depicted in FIG. 6A and as connected to the ballast tubes of the containment system in accordance with embodiments of the invention.

FIG. 6B shows a side view of thruster unit 3 and thruster unit platform 12 with respect to ballast tube 5, curtain 8, stabilizer 9, air vent and electric cable tube 6, water supply tube 7 and emergency floatation system 12a. Ballast tubes 5 are connected to curtain 8 as shown. Each ballast tube 5 in the containment system 1 is connected to a thruster unit platform 12 upon which is mounted thruster unit 3. As can be seen, ballast tube 5 is connected to thruster unit platform 12 by coupling 13a while thruster unit 3 is mounted on thruster unit platform 12 thus providing a connecting means of thruster unit 3, thruster unit platform 12 and ballast tube 5. The curtain 8 is interconnected by marine zippers 13 to the adjacent curtain 8. The ballast tube 5 is connected by coupling 13a to the thruster unit platform 12. The system 1 may be assembled or disassembled at the location of the marine zipper 13 and the coupling 13a located at the ends of the ballast tubes 5 thus allowing thruster unit 3 and thruster unit platform 12 to be the central point for assembly or disassembly operations.

Figure 7A:
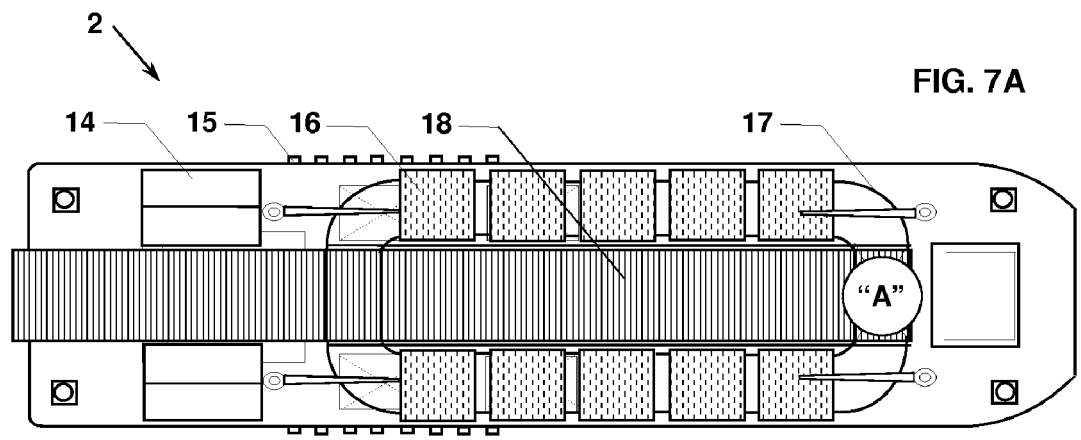
FIGS. 7A-7C are respectively, top, interior and side view of a service vessel in a containment system in accordance with embodiments of the invention.
Figure 7B:
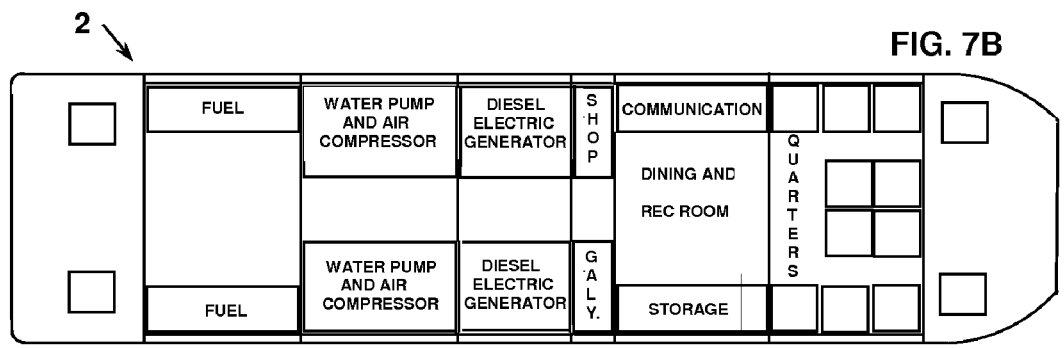
Figure 7C:
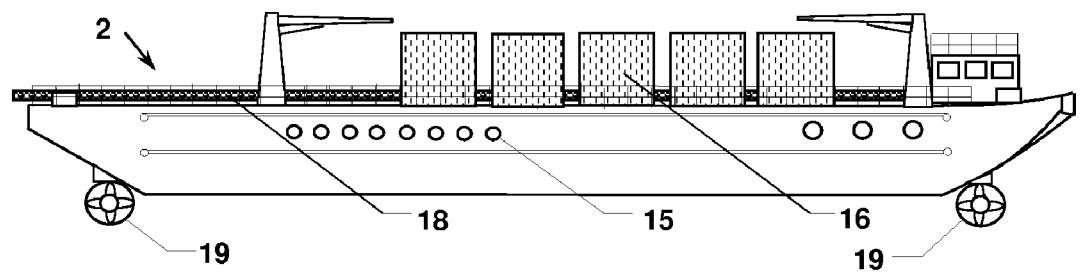

FIGS. 7A, 7B and 7C show top, interior and side views of service vessel 2. The mobility of service vessel 2 is achieved by a plurality of swivel thrusters 19 that can rotate and move the service vessel 2 in any horizontal direction. FIG. 7C shows a pair of such swivel thrusters 19 located at opposite ends of service vessel 2. By means of force from the swivel thrusters 19 the service vessel 2 thus may be moved in any horizontal direction. By means of force from the swivel thrusters 19, service vessel 2 may also assist in maintaining the position of the system 1 through connecting lines (not shown) from service vessel 2 to the ballast tube 5. The hold 14 so indicated on FIG. 7A provides storage space for thruster unit 3 and thruster unit platform 12. The service ports 15 at the midsection of the service vessel 2 as shown on FIG. 7A provide seawater ballast connection and air vent and electric cable connections that are illustrated on FIG. 8.

In initial deployment of the system or after reclaiming the system, ballast tube housing 16 of FIG. 7A provides storage space for the ballast tube 5 and curtain 8. Ballast tube and curtain housing 16 also contains an electric motor to enable the rolling up and unrolling of the ballast tube 5 and curtain 8. The tracks 17 are utilized for movement of the ballast tube and curtain housing 16. The roller rack 18 is used as a working area and launching mechanism for unrolling or rolling up the ballast tube 5 and curtain 8 during assembly or disassembly of ballast tube 5 and curtain 8. The ballast tube and curtain housing 16 has swivel wheels attached to its base that may be positioned on the tracks 17 so as to enable the ballast tube and curtain housing 16 to be properly positioned over the roller rack 18. The proper position of ballast tube and curtain housing 16 is the location marked "A" so indicated on FIG. 7A for the assembly and disassembly of ballast tube 5 and curtain 8. During the assembly and disassembly operations of system 1 the thruster unit 3 and thruster unit platform 12 are removed from, or are stored in, hold 14 of FIG. 7A. Water pumps and electric generators are housed in the designated water pump rooms and generator rooms, as illustrated in FIG. 7B. Personnel quarters and other utility areas are also provided on the service vessel 2 as shown in FIG. 7B.

Figure 8:
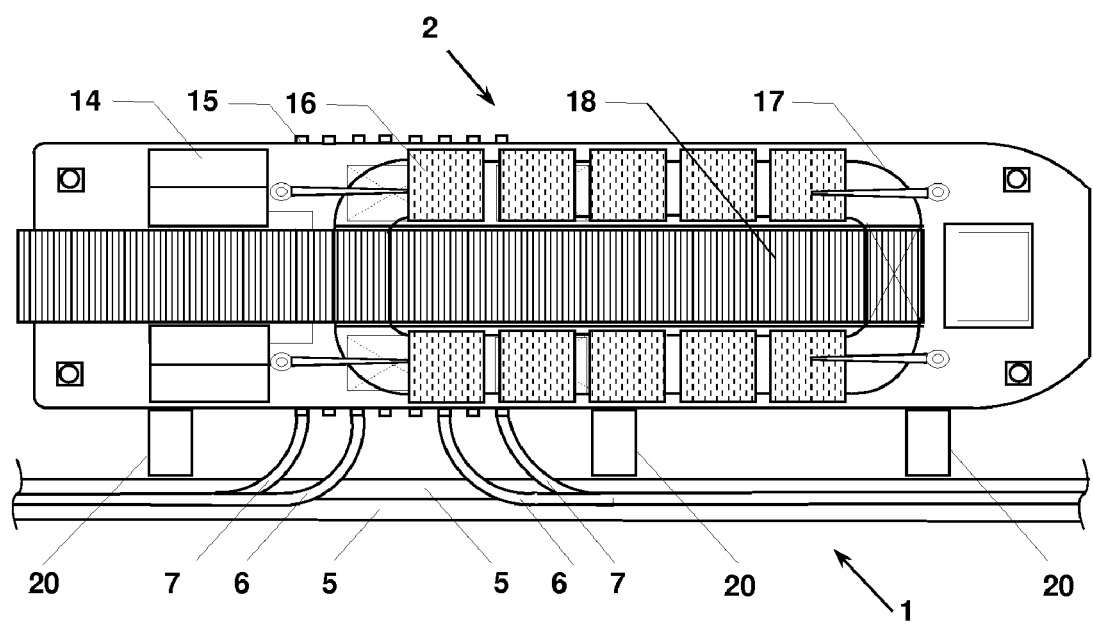
FIG. 8 is a plan view showing the service vessel as moored to a containment system in accordance with embodiments of the invention.

FIG. 8 is a plan view showing the service vessel 2 as docked to the containment system 1 when the containment system 1 is in the surfaced position. The floating mooring boxes 20 are tethered to the service vessel 2. These boxes are employed to prevent possible damage to the vessel and containment system 1 through wave action. The ballast water connection and air vent and electric cable connections 15 are joined to seawater ballast hoses 7 and air vent air vent and electric cable tubes 6. The seawater ballast water hoses 7 and air vent and electric cable tube 6 are of sufficient length and flexibility as to allow containment system 1 to be submerged to a specified water depth. The seawater ballast hoses 7 and air vent and electric cable tubes 6 are utilized in order to service the containment system. Also shown on FIG. 8 are hold 14, ballast tube housing 16, tracks 17 and roller rack 18.

Figure 9A:
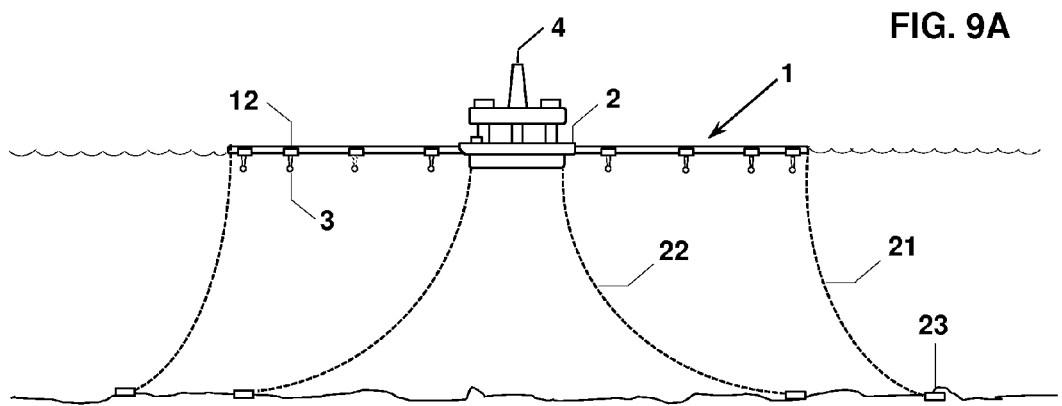
FIG. 9A is a side view showing a containment system in accordance with embodiments of the invention as anchored to the subsea floor and in relation to the offshore drilling rig.

FIG. 9A illustrates a side view of the present invention where containment system 1 is positioned at the surface. In FIG. 9A, it can be seen that containment system 1, chain anchor 21 and offshore drilling rig 4, chain anchor 22 are used. The anchor 23 is also shown. FIG. 9A also shows the position of the offshore drilling rig 4 in relation to the containment system 1. FIG. 9A shows the position of the service vessel 2 and the chain anchor 21 in addition to the thruster 3 and the thruster unit platform 12. Three options are available for securing the containment system 1 alone or in combination. First, the chain anchor 21 may be utilized so as to connect the containment system 1 to the ocean floor as shown. This option may be used in shallower waters where sea floor conditions permit and as a fuel saving measure. As a second option, thruster units 3 may be utilized for the continued positioning of the containment system 1 without an anchoring system. This option would be used where bottom conditions are not desirable for anchoring or in deeper water. Third, the containment system 1 may be tethered to the offshore drilling rig 4. This option would not require an anchoring system or the operation of the containment system 1 self-positing device and may be used primarily as a fuel saving measure.

Figure 9B:
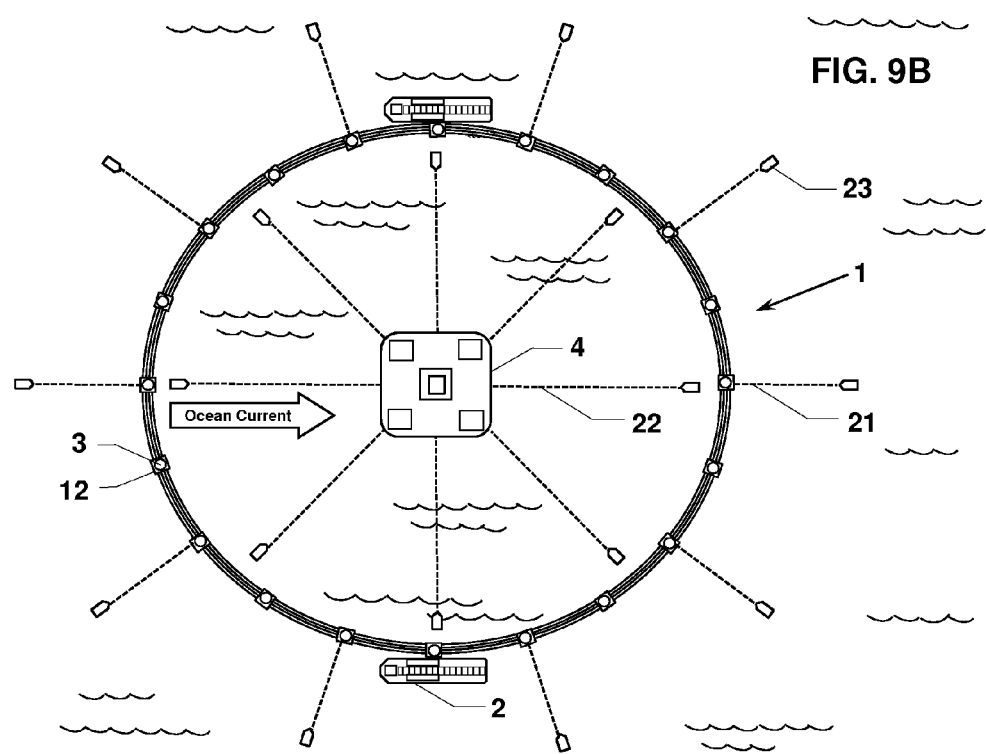
FIG. 9B is a plan view showing the anchored arrangement of a containment system in accordance with embodiments of the invention in relation to the offshore drilling rig.

FIG. 9B shows that the containment system can be utilized with a conventional anchoring system that has been used extensively in the past and is an industry-accepted method. In FIG. 9B, the containment system 1 is positioned at the surface. Offshore drilling rig 4 is illustrated with service vessel 2, thruster unit 3, thruster unit platform 12, the containment system chain anchors 21, the offshore drilling rig chain anchors 22 and the anchors 23.

The discussion above has focused primarily on embodiments of the invention employing curtain barriers. It should be understood that the inventive concepts disclosed herein are capable of many modifications. To the extent such modifications fall within the scope of the appended claims and their equivalents, they are intended to be covered by this patent.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A spill containment system for retaining spills in a body of water having a depth between a surface and a floor, said system comprising:
   a plurality of modules at said surface comprising ballast tubes joined at respective tube ends to form a spill containment enclosure configured to encompass at-risk infrastructure (ARI) and to submerge to a standby depth below said surface upon receiving submerging signals and to rise to said surface upon receiving surfacing signals; said modules further comprising flexible curtains coupled vertically to said ballast tubes to form a containment enclosure below said surface; and
   a deployment control system in operative communication with said ballast tubes, the deployment control system configured to retract said curtains and send submerging signals to employ the ballast tubes to submerge to a standby depth for extended periods of normal operating conditions, and send surfacing signals to employ the ballast tubes to rise to said surface and extend said curtains upon predetermined deployment conditions.

2. The spill containment system of claim 1 further comprising a plurality of propulsion systems coupled to said modules, the propulsion systems configured to drive the containment system in any lateral direction and maintain a minimum distance from the ARI.

3. The spill containment system of claim 2 that further comprises conduits for transferring air, water and electrical power to said ballast tubes, curtain and propulsion systems.

4. The spill containment system of claim 3 wherein said curtains are adapted to unroll vertically upon the surfacing of the ballast system in spill conditions.

5. The spill containment system of claim 1 wherein said curtains are reelable between a rolled-up position during normal operation of said ARI and a downwardly unrolled position during spill conditions, said curtains being formed of a flexible non-metallic material; and a plurality of motors coupled to the top of said curtains and adapted to vertically move said curtains between the rolled-up position and the unrolled position.

6. The spill containment system of claim 5 wherein said modules further comprise:
   a stabilizer spool; and
   a curtain strap extending down one side of a curtain from an anchor point at an upper edge of said curtain, around the stabilizer spool, and back up to a motor driven reel drive, wherein the reel drive is adapted to unreel the curtain strap for curtain deployment and reel in the curtain strap for curtain retraction; and wherein a bottom edge of the curtain is connected to the stabilizer spool, and the curtain system is configured such that in response to rotation of said reel drive the curtain is lifted and rolled reelably around the stabilizer spool such that the curtain is rolled up.

7. The spill containment system of claim 1 further comprising a monitoring system configured to detect spill conditions, wherein the control system is configured to raise the ballast tubes to said surface in response to the monitoring system detecting the spill conditions.

8. The spill containment system of claim 7 wherein said curtain is adapted to be vertically extended and the control system is configured to extend the curtain in response to the monitoring system detecting the spill conditions.

9. The spill containment system of claim 1 that further comprises a service vessel and each said module comprises: a plurality of ballast tubes; and
   a pumping system at least partially housed on said service vessel, the pumping system adapted to:
      upon receiving submerging signals, pass water from the body of water into said ballast tubes so as to lower said ballast tubes to a standby depth, and upon receiving surfacing signals, pass a lighter than water fluid into said ballast tubes so as to raise the ballast tubes to the surface of the body of water.

10. The spill containment system of claim 9 wherein said service vessel further comprises a housing adapted for receiving said modules with said curtain and ballast tubes together in a rolled up state for storage; and a motor configured for retracting said modules rollably into said housing for storage.

11. The spill containment system of claim 9 wherein the plurality of ballast tubes include an access gate adapted to permit the passage of surface vessels into and out of said spill containment enclosure when the ballast system is at the surface of the body of water, said access gate being moved by a propulsion system for opening and closing of the access gate.

12. A self-propelled, submersible, modular spill containment system for containing spills in a body of water having a depth between a surface and a floor comprising:
   a plurality of modules adapted for end-to-end connection about a closed perimeter, wherein each module comprises:
   a curtain with upper and lower edges;
   a reel drive means for selectively rolling the lower edge of said curtain toward or away from said upper edge;
   a ballast tube with an interior volume, said ballast tube supporting said curtain along said upper edge;
   a propulsion means attached to a portion of said modules for moving the spill containment system to a specified location;
   a pumping system for passing a lighter than water fluid into the interior volume of said ballast tube and for passing water from the body of water into said ballast tube; and
   a deployment control system in operative communication with said pumping system wherein said plurality of containment modules are assembled end-to-end to encircle at-risk infrastructure (ARI) with operative connection between said pumping system and a plurality of ballast tube interior volumes to pass water from the body of water into said ballast tubes so as to lower said modules to a standby depth above the floor of the body of water and below the water body surface for extended periods of normal operating conditions, and to pass a lighter than water fluid into said ballast tubes so as to raise said ballast tubes to the surface of said body of water upon spill conditions.

* * * * *